(12) United States Patent
Ramani et al.

(10) Patent No.: US 7,223,354 B2
(45) Date of Patent: May 29, 2007

(54) PROMOTED NICKEL-MAGNESIUM OXIDE CATALYSTS AND PROCESS FOR PRODUCING SYNTHESIS GAS

(75) Inventors: Sriram Ramani, Ponca City, OK (US); Joe D. Allison, Ponca City, OK (US); David M. Minahan, Stillwater, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 471 days.

(21) Appl. No.: 10/339,109

(22) Filed: Jan. 9, 2003

(65) Prior Publication Data

US 2003/0165424 A1    Sep. 4, 2003

Related U.S. Application Data

(60) Provisional application No. 60/359,258, filed on Feb. 22, 2002.

(51) Int. Cl.
C01B 3/40 (2006.01)
(52) U.S. Cl. ..................................................... 252/373
(58) Field of Classification Search ................. 252/373
See application file for complete search history.

(56) References Cited

U.S. PATENT DOCUMENTS

| | | | |
|---|---|---|---|
| RE28,655 E | 12/1975 | Rostrup-Nielsen | 252/466 J |
| 4,000,988 A * | 1/1977 | Uemoto et al. | 48/214 A |
| 4,844,837 A | 7/1989 | Heck et al. | 252/373 |
| 4,877,550 A | 10/1989 | Goetsch et al. | 252/373 |
| 5,149,464 A * | 9/1992 | Green et al. | 252/373 |
| 5,338,488 A * | 8/1994 | Choudhary et al. | 252/373 |
| 5,368,835 A | 11/1994 | Choudhary et al. | 423/651 |
| 5,431,855 A | 7/1995 | Green et al. | 252/373 |
| 5,500,149 A | 3/1996 | Green et al. | 252/373 |
| 5,510,056 A | 4/1996 | Jacobs et al. | 252/373 |
| 5,648,582 A | 7/1997 | Schmidt et al. | 585/652 |
| 5,654,491 A | 8/1997 | Goetsch et al. | 568/469.9 |
| 5,744,419 A | 4/1998 | Choudhary et al. | 502/326 |
| 5,855,815 A | 1/1999 | Park et al. | 252/373 |
| 6,402,989 B1 * | 6/2002 | Gaffney | 252/373 |
| 6,409,940 B1 * | 6/2002 | Gaffney et al. | 252/373 |
| 6,488,907 B1 | 12/2002 | Barnes et al. | 423/418.2 |
| 6,635,191 B2 * | 10/2003 | Figueroa et al. | 252/373 |
| 6,680,006 B2 * | 1/2004 | Chantal | 252/373 |
| 6,774,148 B2 * | 8/2004 | O'Rear | 518/702 |
| 6,887,456 B2 * | 5/2005 | Xu et al. | 423/651 |
| 2002/0000539 A1 * | 1/2002 | Gaffney et al. | 252/373 |

FOREIGN PATENT DOCUMENTS

EP    0 303438 A3    12/1989

OTHER PUBLICATIONS

PCT/US03/00627, PCT International Search Report dated May 7, 2003.
A. Cybulski and J.A. Moulijn, "Structured Catalysts and Reactors," Marcel Dekker, Inc. (1998) 599-615, X. Xu and J.A. Moulijn, Ch. 21 "Transformation of a Structured Carrier Into Structured Catalyst", no month.
V.R. Choudhary et al., "Energy efficient conversion of methane to syngas over NiO-MgO solid solution," Applied Energy (2000) 66: 161-175, no month.
V.R. Choudhary et al., "NiO-Alkaline Earth Oxide Catalysts for Oxidative Methane-to-Syngas Conversion: Influence of Alkaline Earth Oxide on the Surface Properties and Temperature-Programmed Reduction/Reaction ny $H_2$ and Methane, J. Catalysis," (1998) 178:576-585, no month.
V.R. Choudary et al., "Beneficial effects of cobalt addition on Ni-catalysts for oxidative conversion of methane to syngas, Applied Catalysis A: General," (1997) 162:235-238, no month.
V.R. Choudhary et al., "Oxidative Conversion of Methane to Syngas over Nickel Supported on Commercial Low Surface Area Porous Catalyst Carriers Precoated with Alkaline and Rare Earth Oxides," J. Catalysis (1997) 172:281-293, no month.
V.R. Choudhary et al., "Selective Oxidation of Methane to CO and $H_2$ over Ni-MgO at Low Temperatures," Angew. Chem. Int. Ed. Engl. (1992) 31:1189-1190, no month.
A.G. Dietz III and L.D. Schmidt, "Effect of pressure on three catalytic partial oxidation reactions at millisecond contact times," Catalysts Letters (1995) 33:15-29, no month.
M. Fichtner et al., "Microstructured Rhodium Catalysts for the Partial Oxidation of Methane to Syngas under Pressure," Ind. Eng. Chem. Res. (2001) 40:3475-3483, no month.
C.J. Geankoplis, "Transport Processes and Unit Operations," Tyler Standard Screen Scale, Allyn and Bacon, Inc., Boston, MA, p. 837, no date.
E. Ruckenstein et al., "Methane partial oxidation over NiO-MgO solid solution catalysts," Applied Catalysis A; General (1999) 183:85-92, no month.
E. Ruckenstein et al., "Combination of $CO_2$ Reforming and Partial Oxidation of Methane over NiO-MgO Solid Solution Catalysts," Ind. Eng. Chem. Res. (1998) vol. 37, No. 5, 1744-1747, no month.
Yun Hang Hu et al., "Binary MgO-Based Solid Solution Catalysts for Methane Conversion to Syngas," Catalysis Reviews, (2002) Marcel Dekker, Inc., 44(3), 423-453, no month.

* cited by examiner

Primary Examiner—Wayne A. Langel
(74) Attorney, Agent, or Firm—Conley Rose P.C.

(57) ABSTRACT

A process and catalyst are disclosed for the catalytic partial oxidation of light hydrocarbons to produce synthesis gas at superatmospheric pressures. A preferred catalyst used in the process includes a nickel-magnesium oxide solid solution and at least one promoter chosen from Cr, Mn, Mo, W, Sn, Re, Rh, Ru, Ir, Pt, La, Ce, Sm, Yb, Lu, Bi, Sb, In and P, and oxides thereof, carried on a refractory support.

12 Claims, No Drawings

PROMOTED NICKEL-MAGNESIUM OXIDE CATALYSTS AND PROCESS FOR PRODUCING SYNTHESIS GAS

CROSS REFERENCE TO RELATED APPLICATION

This application claims the benefit under 35 U.S.C. § 119(e) of U.S. Provisional Patent Application No. 60/359,258 filed Feb. 22, 2002.

BACKGROUND OF THE INVENTION

1. Field of the Invention

The present invention generally relates to catalysts and processes for converting a light hydrocarbon (e.g., natural gas) and oxygen to a product comprising a mixture of carbon monoxide and hydrogen ("synthesis gas" or "syngas"). More particularly, the invention relates to such processes and catalysts employing Ni—MgO containing catalysts.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane and other light hydrocarbons (i.e., $C_1$-$C_5$ hydrocarbons) as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or "syngas"). In a second step, the syngas is converted to hydrocarbons.

Current industrial use of methane as a chemical feedstock proceeds by the initial conversion of methane to carbon monoxide and hydrogen by either steam reforming, which is the most widespread process, or by dry reforming. Steam reforming currently is the major process used commercially for the conversion of methane to synthesis gas, proceeding according to Equation 1.

$$CH_4 + H_2O \rightleftharpoons CO + 3H_2 \qquad (1)$$

Although steam reforming has been practiced for over five decades, efforts to improve the energy efficiency and reduce the capital investment required for this technology continue. For many industrial applications, the 3:1 ratio of $H_2$:CO products is problematic, and the typically large steam reforming plants are not practical to set up at remote sites of natural gas formations. Methane residence times in steam reforming are on the order of 0.5-1 second, whereas for heterogeneously catalyzed partial oxidation, the residence time is on the order of a few milliseconds. For the same production capacity, syngas facilities for the partial oxidation of methane can be far smaller, and less expensive, than facilities based on steam reforming. A recent report (M. Fichtner et al., *Ind. Eng. Chem. Res.* (2001) 40:3475-3483) states that for efficient syngas production, the use of elevated operation pressures of about 2.5 MPa is required. Those authors describe a partial oxidation process in which the exothermic complete oxidation of methane is coupled with the subsequent endothermic reforming reactions (water and $CO_2$ decomposition). This type of process can also be referred to as autothermal reforming or ATR, especially when steam is co-fed with the methane. Certain microstructured rhodium honeycomb catalysts are employed which have the advantage of a smaller pressure drop than beds or porous solids (foams) and which resist the reaction heat of the total oxidation reaction taking place at the catalyst inlet.

The catalytic partial oxidation ("CPOX") or direct partial oxidation of hydrocarbons (e.g., natural gas or methane) to syngas has also been described in the literature. In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + 1/2 O_2 \rightarrow CO + 2H_2 \qquad (2)$$

This ratio is more useful than the $H_2$:CO ratio from steam reforming for the downstream conversion of the syngas to chemicals such as methanol or to fuels. The CPOX reaction is exothermic, while the steam reforming reaction is strongly endothermic. Furthermore, oxidation reactions are typically much faster than reforming reactions. This allows the use of much smaller reactors for catalytic partial oxidation processes that is possible in a conventional steam reforming process.

While its use is currently limited as an industrial process, the direct partial oxidation or CPOX of methane has recently attracted much attention due to its inherent advantages, such as the fact that due to the significant heat that is released during the process, there is no requirement for the continuous input of heat in order to maintain the reaction, in contrast to steam reforming processes. An attempt to overcome some of the disadvantages and costs typical of steam reforming by production of synthesis gas via the catalytic partial oxidation of methane is described in European Patent No. 303,438. According to that method, certain high surface area monoliths coated with metals or metal oxides that are active as oxidation catalysts, e.g., Pd, Pt, Rh, Ir, Os, Ru, Ni, Cr, Co, Ce, La, and mixtures thereof, are employed as catalysts. Other suggested coating metals are noble metals and metals of groups IA, IIA, III, IV, VB, VIB, or VIIB of the periodic table of the elements.

U.S. Pat. No. 5,149,464 describes a method for selectively converting methane to syngas at 650-950° C. by contacting a methane/oxygen mixture with a solid catalyst which is a d-block transition metal on a refractory support, an oxide of a d-block transition metal, or a compound of the formula $M_xM'_yO_z$ wherein M' is a d-block transition metal and M is Mg, B, Al, Ga, Si, Ti, Zr, Hf or a lanthanide. U.S. Pat. No. 5,500,149 describes the combination of dry reforming and partial oxidation of methane, in the presence of added $CO_2$ to enhance the selectivity and degree of conversion to synthesis gas. U.S. Pat. No. 5,431,855 demonstrates the catalytic conversion of mixtures of $CO_2$, $O_2$ and $CH_4$ to synthesis gas over selected alumina supported transition metal catalysts. Maximum CO yield reported was 89% at a gas hourly space velocity (GHSV) of $1.5 \times 10^4$ hr$^{-1}$, temperature of 1,050° K and pressure of 100 kPa. The addition of $CO_2$ tends to reduce the $H_2$:CO ratio of the synthesis gas, however.

For successful commercial scale operation a catalytic partial oxidation process must be able to achieve a high conversion of the methane feedstock at high gas hourly space velocities, and the selectivity of the process to the desired products of carbon monoxide and hydrogen must be high. Dietz III and Schmidt (*Catalysis Letters* (1995) 33:15-29) describe the effects of 1.4-6 atmospheres pressure on methane conversion and product selectivities in the direct oxidation of methane over a Rh-coated foam monolith. The selectivities of catalytic partial oxidation to the desired products, carbon monoxide and hydrogen, are controlled by several factors. One of the most important of these factors is the choice of catalyst composition. In most of the existing syngas production processes it is difficult to select a catalyst that will be economical for large scale industrial use, yet will provide the desired level of activity and selectivity for CO and $H_2$ and demonstrate long on-stream life. Moreover, such high conversion and selectivity levels must be achieved without detrimental effects to the catalyst, such as the formation of carbon deposits ("coke") on the catalyst, which severely reduces catalyst performance. Accordingly, substantial effort in this field continues to be devoted to the development of catalysts allowing commercial performance without coke formation. Also, in order to overcome the relatively high pressure drop associated with gas flow through a fixed bed of catalyst particles, and to make possible the operation of the reactor at high gas space velocities, various types of structures for supporting the active catalyst in the reaction zone have been proposed. For example, U.S. Pat. No. 4,844,837 (R. M. Heck and P. Flanagan/Engelhard Corporation) describes certain catalysts for the partial oxidation of methane. Those catalysts contain a platinum group metal, optionally supplemented with one or more of chromium, copper, vanadium, cobalt, nickel and iron, and supported on a high surface area alumina-coated refractory metal oxide monolith. The alumina coating is stabilized by a rare earth metal oxide and/or alkaline earth metal oxide against an undesired high temperature phase transition to alpha alumina.

A number of process regimes have been proposed for the production of syngas via partial oxidation reactions. For example, the process described in U.S. Pat. No. 4,877,550 employs a syngas generation process using a fluidized reaction zone. Such a process however, requires downstream separation equipment to recover entrained supported-nickel catalyst particles.

A fixed bed reactor configuration would alleviate the catalyst degradation, but would require a pressure differential (pressure drop) to allow gas flow over the catalyst. To overcome the relatively high pressure drop associated with gas flow through a fixed bed of catalyst particles, which can prevent operation at the high gas space velocities required, various structures for supporting the active catalyst in the reaction zone have been proposed. U.S. Pat. No. 5,510,056 discloses a monolithic support such as a ceramic foam or fixed catalyst bed having a specified tortuosity and number of interstitial pores that is said to allow operation at high gas space velocity. Catalysts used in that process comprise ruthenium, rhodium, palladium, osmium, iridium, and platinum. U.S. Pat. No. 5,648,582 also discloses a process for the catalytic partial oxidation of a feed gas mixture consisting essentially of methane. The methane-containing feed gas mixture and an oxygen-containing gas are passed over an alumina foam supported metal catalyst at space velocities of 120,000 $hr^{-1}$ to 12,000,000 $hr^{-1}$. The catalytic metals exemplified are rhodium and platinum, at a loading of about 10 wt %.

Catalysts containing Group VIII metals such as nickel on a variety of supports are known in the art. For example, V. R. Choudhary et al. (*J. Catal.* (1997) 172:281-293) disclose the oxidative conversion of methane to syngas over certain nickel-based catalysts supported on low surface area porous carriers precoated with alkaline and rare earth oxides.

U.S. Pat. No. 5,149,464 describes a method for selectively converting methane to syngas at 650° C. to 950° C. by contacting the methane/oxygen mixture with a solid catalyst, which is either:

a catalyst of the formula $M_xM'_yO_z$ where:

M is at least one element selected from Mg, B, Al, Ln, Ga, Si, Ti, Zr and Hf;

Ln is at least one member of lanthanum and the lanthanide series of elements;

M' is a d-block transition metal, and each of the ratios x/z and y/z and (x+y)/z is independently from 0.1 to 8; or an oxide of a d-block transition metal; or a d-block transition metal on a refractory support; or a catalyst formed by heating a) or b) under the conditions of the reaction or under non-oxidizing conditions. The d-block transition metals are stated to be selected from those having atomic number 21 to 29, 40 to 47 and 72 to 79, the metals scandium, titanium, vanadium, chromium, manganese, iron, cobalt, nickel, copper, zirconium, niobium, molybdenum, technetium, ruthenium, rhodium, palladium, silver, hafiium, tantalum, tungsten, rhenium, osmium, iridium, platinum and gold. Preferably M' is selected from Fe, Os, Co, Rh, Ir, Pd, Pt and particularly Ni and Ru. The exemplary conversions, selectivities, and gas hourly space velocities are relatively low however, while reaction temperatures are relatively high, and the effects of coke formation are not addressed.

U.S. Pat. No. 5,855,815 (Park) describes certain alkali-element promoted NiO catalysts supported on silicon-containing supports. These catalysts are used for $CO_2$ reforming of methane with or without the addition of $O_2$ and $H_2O$.

E. Ruckenstein et al. (*Applied Catalysis A: General* 183:85-92 (1999)) describe certain solid solution catalysts for partial oxidation of methane and $CO_2$ reforming of methane containing NiO supported on MgO, $SiO_2$, $AlO_3$ or $La_2O_3$. Solid solution systems are formed by metal oxides that have comparable physical and chemical properties, such as crystallographic structures, lattice dimensions and bond distances. In addition, the electronegativity of the metals sharing the oxygen determines the stability of the resulting catalyst. As stated by Ruckenstein et al. (*Ind. Eng. Chem. Res.*, 1998, 37, 1744-1747):

"NiO and MgO are both face-centered-cubic oxides with very close lattice parameters (4.1496 and 4.2112 Å for NiO and MgO, respectively) and bond distances (2.10 and 2.11 Å for NiO and MgO, respectively). With the electronegativity of Mg (1.293) being lower than that of Ni (1.8), the binding of oxygen is stronger to Mg than to Ni, it is difficult to reduce NiO to Ni(0) metal, thus improving the coking resistance of the Ni catalyst."

U.S. Pat. No. 5,744,419 (Choudhary et al.) describes certain supported Ni and Co catalysts, with noble metal promoters, that are employed for the production of syngas by partial oxidation with oxygen or oxidative steam and/or $CO_2$ reforming with oxygen of methane or light hydrocarbons.

U.S. Pat. No. 5,368,835 (Choudhary et al.) and U.S. Pat. No. 5,338,488 (Choudhary et al.) describe certain Ni-based composite catalysts containing various rare earth or alkaline earth elements, for catalyzing the production of synthesis gas by oxidative conversion of methane.

V. R. Choudhary et al. (*J. Catalysis* 178:576-585 (1998)) describe processes for the oxidative conversion of methane to syngas catalyzed by NiO supported on various oxides such as CaO, MgO and rare earth oxides. Support effects on NiO in the partial oxidation of methane to syngas are discussed. The beneficial effects of adding Co to certain NiO catalysts for oxidative conversion of methane to syngas have also been described (Choudhary et al., *Applied Catalysis A: General* 162:235-238 (1997)). The selective oxidation of methane to CO and $H_2$ over certain Ni/MgO and NiO/MgO catalysts at low temperature are described by V. R. Choudhary et al. in *Angew. Chem. Int. Ed. Engl.* (1992) 31:1189-1190. Choudhary and Mamman also describe methane to CO and $H_2$ conversion reactions involving partial oxidation by $O_2$, oxy-steam reforming, oxy-$CO_2$ reforming, $CO_2$ reforming, and simultaneous steam and $CO_2$ reforming over certain NiO—MgO solid solution catalysts (*Applied Energy* (2000) 66:161-175).

A potential disadvantage of many of the existing catalytic hydrocarbon conversion methods is the need to include steam in the feed mixture to suppress coke formation on the catalyst. Typically, the ratio of steam to methane, or other light hydrocarbon, in the feed gas must be maintained at 1:1 or greater. The volume of gaseous $H_2O$ significantly reduces the available reactor space for the production of synthesis gas. Another disadvantage of using steam in the production of syngas is that steam increases the production of $CO_2$, which is carbon that is lost to the process of making CO product. Other existing methods have the potential drawback of requiring the input of a $CO_2$ stream in order to enhance the yield and selectivity of CO and $H_2$ products. Another drawback of some existing processes is that the catalysts that are employed often result in the production of significant quantities of carbon dioxide, steam, and $C_2$+ hydrocarbons. This often renders the product gas mixture unsuitable, for example, for feeding directly into a Fischer-Tropsch type catalytic system for further processing into higher hydrocarbon products. Moreover, for efficient syngas production, the use of elevated operation pressures is necessary in order to ensure the direct transition to a downstream process, such as a Fischer-Tropsch process, without the need for intermediate compression.

At the present time, none of the known processes appear capable of sufficiently high space-time yields. Typically, partial oxidation reactor operation under pressure is problematic because of shifts in equilibrium, undesirable secondary reactions, coking and catalyst instability. Another problem frequently encountered is loss of noble metals due to catalyst instability at higher operating temperatures. Although advancement has been made toward providing higher levels of conversion of reactant gases and better selectivities for CO and $H_2$ reaction products, problems still remain with finding sufficiently stable and long-lived catalysts capable of conversion rates that are attractive for large scale industrial use. Accordingly, a continuing need exists for better processes and catalysts for the production of synthesis gas, particularly from methane or methane containing feeds. In such improved processes the catalysts would be stable at high temperatures and resist coking. They would also retain a high level of conversion activity and selectivity to carbon monoxide and hydrogen under conditions of high gas space velocity and elevated pressures for long periods of time on-stream.

SUMMARY OF PREFERRED EMBODIMENTS

The present invention provides a nickel-magnesium oxide based catalyst and syngas production method that overcomes many of the problems associated with existing syngas processes and catalysts, and make possible the high space-time yields that are necessary for a commercially feasible syngas production facility. A process of preparing synthesis gas using promoted Ni—MgO supported catalysts for the catalytic partial oxidation (CPOX) of methane or natural gas is disclosed. One advantage of the new catalysts employed in the process is that they demonstrate a high level of activity and selectivity to carbon monoxide and hydrogen under conditions of high gas hourly space velocity, elevated pressure and high temperature. Another advantage of the new catalysts is that they are more resistant to coking in a catalytic partial oxidation syngas production process than conventional unpromoted Ni—MgO catalysts. The enhanced resistance to carbon deposition is appreciable, the preferred catalysts demonstrating at least 70-88% less carbon deposition than corresponding unpromoted Ni—MgO catalysts.

The new catalyst structures contain more economical catalytic materials and overcome many of the drawbacks of previous syngas catalysts, to provide higher conversion and syngas selectivity. The catalyst used for producing synthesis gas comprises a promoter, which in some cases is chromium and/or chromium oxide and a Ni—MgO containing solid solution carried on a refractory monolith or carried on a plurality of discrete refractory structures or particulates. The term "monolith" as used herein is any singular piece of material of continuous manufacture such as solid pieces of metal or metal oxide or foam materials or honeycomb structures. The term "discrete" structures or units, as used herein, refer to supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures making up the catalyst bed have a maximum characteristic length (i.e., diameter or longest dimension) of less than six millimeters, preferably less than three millimeters. The new promoted Ni—MgO catalysts show improved and stable performance for methane partial oxidation to syngas at elevated pressure and flow rates, which is now reported for the first time.

The new promoted Ni—MgO catalysts are preferably prepared by serially applying MgO, Ni and/or NiO, or their precursor compounds, and one or more promoters, or precursors thereof, to a refractory support, and stabilizing the catalyst structure at intermediate and final stages during its synthesis. The term "refractory support" refers to any material that is mechanically stable to the high temperatures of a catalytic partial oxidation syngas generating process, which is typically 500° C.-1,600° C., but may be as high as 2,000° C. Suitable refractory materials for the support include zirconia, magnesium stabilized zirconia, zirconia stabilized alumina, yttrium stabilized zirconia, calcium stabilized zirconia, alumina, cordierite, titania, silica, magnesia, niobia, vanadia and the like. Preferably the alumina component is alpha-alumina.

"Stabilizing" the catalyst structure means enhancing the resistance of the final catalyst structure to chemical and physical decomposition under the anticipated CPOX reaction conditions it will encounter when employed on stream in a syngas production reactor operated at superatmospheric feed gas pressures. Stabilizing preferably includes thermally conditioning the catalyst during catalyst construction, i.e., at intermediate and final stages of catalyst preparation. For example, after the MgO precursor compound is applied to the refractory support, it is subjected to one or more heat treatments, and after the Ni/NiO precursor compound is applied to the MgO coated support, it is subjected to one or more heat treatments, to yield a more stable and long lived catalyst for use in the CPOX reactor. Thermally conditioning includes heat treating the catalyst, or an intermediate stage of the catalyst, according to a defined heating and cooling program. In some embodiments at least one such heat treatment serves to calcine the catalyst or decompose a precursor compound at an intermediate preparation stage of the catalyst. Preferably at least one of the heat treatments includes heating the catalyst or intermediate at a temperature that approaches or approximates the expected operating temperature of the CPOX reactor, or is within the operating range of the reactor. In certain embodiments, the stabilizing protocol includes heating the catalyst or intermediate at a predetermined heating rate up to a first temperature and then heating the catalyst or intermediate at a predetermined heating rate from the first temperature to a second temperature. In some embodiments of the catalyst preparation method, the heat treatment also includes holding the catalyst or intermediate, at the first and second temperatures for predetermined periods of time. In some embodiments, the first temperature is about 125-325° C. and the second temperature is about 300-900° C., preferably about 500-700° C. In some embodiments the heating rate is about 0.1-50° C., preferably 1-5° C./min, and the holding or dwell time at that temperature is about 30-1,440 min, preferably 60-240 min. In some embodiments the stabilizing protocol also includes subjecting the catalyst or intermediate stage to a defined cooling program. In some embodiments, the catalyst preparation method also includes reducing the catalyst at a predetermined temperature in a reducing atmosphere. In certain preferred embodiments the promoter is chromium and/or chromium oxide, more preferably containing about 5 wt % magnesium (wt % of the total weight of catalyst, including the support). In terms of molar amounts, the preferred embodiments contain chromium and nickel as follows: Cr/Mg atomic ratio of 0.1, Ni/Mg atomic ratio of 1.3. In certain other preferred embodiments, the second promoter (dopant) is platinum and/or platinum oxide, more preferably at Pt/Mg atomic ratio of 0.001. Addition of very small amounts of Pt or Rh lowered the temperature at which the methane-oxygen reaction mixture is ignited to initiate the reaction, without having any significant effect on the overall performance.

In some embodiments, the catalyst support comprises a material such as magnesium stabilized zirconia, calcium stabilized zirconia, yttrium stabilized zirconia, alumina, zirconia stabilized alumina, cordierite, titania, mullite, refractory nitrides or carbides, or a mixture of two or more of those materials. In certain preferred embodiments the support material is partially (MgO) stabilized zirconia (PSZ) in the form of a foam monolith. In other embodiments the support is a honeycomb monolith. In certain preferred embodiments the catalytic materials are carried on granules, beads, pills, pellets, cylinders, trilobes, extrudates, spheres or other rounded shapes, or another manufactured configuration, that can be combined to make a catalyst bed.

In accordance with certain embodiments of the present invention, a syngas production catalyst is provided. The catalyst comprises a solid solution containing magnesium oxide, nickel oxide, at least one promoter chosen from Cr, Mn, Co, Mo, W, Sn, Re, Rh, Pd, Ru, Ir, Pt, La, Ce, Sm, Yb, Eu, Pr, Lu, Bi, Sb, In and P, and oxides thereof, and a refractory support. The catalyst possesses enhanced stability under catalytic partial oxidation promoting conditions, such as temperature, reactant gas pressure, flow rate and time on stream in a syngas production reactor. "Enhanced stability" means that the catalyst is more pressure tolerant (to at least 2 atm operating pressure, and preferably to at least 3 atm), high temperature resistant (up to at least 1,500° C.) and longer lived (reduced coking) for longer periods of time on-stream than typical syngas catalysts. A stability-enhanced catalyst also avoids the common problem of loss of catalyst metal at higher operating temperatures due to catalyst instability and volatilization.

In accordance with certain other embodiments of the present invention, a syngas production catalyst is prepared by impregnating a refractory metal oxide support with a solution of a thermally decomposable magnesium oxide precursor compound, preferably a magnesium salt. The magnesium impregnated support is then subjected to a programmed heat treatment. The magnesium impregnated support is then impregnated with a solution of a decomposable nickel or nickel oxide precursor compound, preferably a nickel salt, to provide a nickel/magnesium oxide intermediate, which is then subjected to a programmed heat treatment. The intermediate is then impregnated with a solution of a decomposable promoter compound, the metal ion of which is Cr, Mn, Co, Mo, W, Sn, Re, La, Ce, Sm, Yb, Eu, Pr, Lu, Bi, Sb, In or P to provide a promoter-1/nickel/magnesium oxide intermediate, which is then subjected to a programmed heat treatment. In some embodiments, the intermediate is then impregnated with a solution of another decomposable promoter precursor compound (e.g., a metal salt), the metal ion of which is preferably Pt, Rh, Ru, Ir, or Pd, to provide a promoter-2/promoter-1/nickel/magnesium oxide intermediate, which is then subjected to a programmed heat treatment. The method preferably further comprises reducing the subjected to a programmed heat treatment promoters/nickel/magnesium oxide intermediate to provide a supported catalyst having activity for catalyzing the net partial oxidation of methane in the presence of $O_2$ to CO and $H_2$ under partial oxidation promoting conditions in a short contact time reactor (i.e., ≦10 milliseconds reactant/catalyst contact time. In certain preferred embodiments a defined heat treating program is employed in preparing the catalyst, such as, for example, after each impregnation step, heat treating in air according to the following schedule: (a) at a heating rate of about 5° C./min ramp up to about 125° C. and hold at about 125° C. for about 1 hour; (b) at a heating rate of about 5° C./min ramp up to about 400° C. and hold at about 400° C. for about 1 hour; (c) at a heating rate of about 5° C./min ramp up to about 800° C. and hold at about 800° C. for about 1 hour; (c) at a heating rate of about 5° C./min ramp up to about 1,000° C. and hold at about 1000° C. for about 3 hours; and (d) at a cooling rate of about 10° C./min ramp down to room temperature. In certain other preferred embodiments, the support is subjected to a programmed heat treatment (pre-calcined) that includes heat treating in air according to the following schedule: (a) at a heating rate of about 5° C./min ramp up to about 125° C. and hold at about 125° C. for about 1 hour; (b) at a heating rate of about 5° C./min ramp up to about 400° C. and hold at about 400° C. for about 1 hour; (c) at a heating rate of about 5° C./min ramp up to about 1,100° C. and hold at about 1,100° C. for about 3 hours; and (d) at a cooling rate of about 110° C./min ramp down to room temperature. In certain other preferred embodiments, the final catalyst is reduced using a defined reduction program such as, for example, reducing in $N_2/H_2$ mixture (50/50 by volume) according to the following schedule: (a) at a heating rate of about 3° C./min ramp up to about 125° C. and hold at about 125° C. for about 0.5 hour; (b) at a heating rate of about 5° C./min ramp up to about 700° C. and hold at about 700° C. for about 3 hours; (c) at a cooling rate of about 10° C./min ramp down to room temperature.

In accordance with still other embodiments of the present invention, syngas production processes are provided that comprise the net catalytic partial oxidation of a hydrocarbon feedstock by contacting a feed stream comprising a hydrocarbon feedstock and an oxygen-containing gas with a catalyst in a reaction zone maintained at partial oxidation promoting conditions effective to produce an effluent stream comprising carbon monoxide and hydrogen.

In accordance with certain embodiments of the present invention a method or process of converting methane or natural gas and $O_2$ to a product gas mixture containing CO and $H_2$, preferably in a molar ratio of about 2:1$H_2$:CO, is provided. The process comprises mixing a methane-containing feedstock and an $O_2$ containing feedstock to provide a reactant gas mixture feedstock. Although methane is a preferred feed gas, other light hydrocarbons having from 2 to 5 carbon atoms ($C_2$-$C_5$), and mixtures thereof, or natural gas, may also serve as satisfactory feedstocks. The $O_2$ containing feedstock may be pure oxygen gas, or may be air or $O_2$-enriched air. The reactant gas mixture is fed into a reactor where it comes into contact with a catalytically effective amount of a promoted nickel-magnesium oxide solid solution carried on a refractory support. Advantageously, certain preferred embodiments of the process are capable of operating at superatmospheric reactant gas pressures (preferably in excess of 2 atm, and more preferably at least 3 atm (about 45 psig)) to efficiently produce synthesis gas.

In certain embodiments the method includes converting a light hydrocarbon (i.e., $C_1$-$C_5$, preferably methane) to a product gas mixture comprising CO and $H_2$ is provided which comprises mixing a light hydrocarbon-containing feedstock and an $O_2$-containing feedstock to provide a reactant gas mixture having a carbon:$O_2$ molar ratio of about 1.5:1 to about 3.3:1, preferably 2:1. The method includes passing the reactant gas mixture over a supported catalyst comprising a Ni—MgO solid solution disposed on a ceramic oxide support. The catalyst includes at least one promoter chosen from the group Cr, Mn, Co, Mo, W, Sn, Re, Rh, Pd, Ru, Ir, Pt, La, Ce, Sm, Yb, Eu, Pr, Lu, Bi, Sb, In or P, and oxides thereof. In certain preferred embodiments the promoter comprises chromium and/or chromium oxide. In certain other preferred embodiments a second promoter comprising platinum, rhodium, ruthenium, iridium or palladium is deposited over the first promoter, or is mixed with the first promoter. The method also includes passing the reactant gas mixture feed over the catalyst at a gas hourly space velocity of about 20,000 to about 100,000,000 hr$^{-1}$, such that the contact time of a portion of the reactant gas mixture in contact with the catalyst is no more than about 200 milliseconds, preferably less than 20 milliseconds, and more preferably 10 milliseconds or less. In certain preferred embodiments the method also includes maintaining catalytic partial oxidation promoting conditions of methane/oxygen ratio, temperature, pressure and flow rate.

Still other embodiments, features and advantages of the present invention will appear from the following description.

DETAILED DESCRIPTION OF PREFERRED EMBODIMENTS

The term "catalytic partial oxidation" when used in the context of the present syngas production methods and catalytic activities, in addition to its usual meaning, can also refer to an overall or net catalytic partial oxidation process, in which light alkanes (preferably comprising mainly methane) and oxygen are supplied as reactants and the resulting product stream is predominantly the partial oxidation products CO and $H_2$, rather than containing an appreciable amount of the complete oxidation products $CO_2$ and $H_2O$. For example, the preferred catalysts serve in the preferred short contact time process of the invention, which is described in more detail below, to yield a product gas mixture containing $H_2$ and CO in the highly desirable molar ratio of approximately 2:1, especially when pure methane is reacted with oxygen under partial oxidation promoting conditions. This corresponds to the stoichiometric amounts of $H_2$ and CO reaction products, in a molar ratio of 2:1, that result from the partial oxidation of methane, as shown in Equation 2, in the Background of the Invention. Although the primary reaction mechanism of the process is partial oxidation (CPOX), other oxidation reactions and secondary reactions may also occur in the reactor to a lesser or minor extent. For instance, other reactions such as steam reforming (see Equation 1), dry reforming (Equation 3) and/or water-gas shift (Equation 4) may also occur to a lesser or minor extent.

$$CH_4 + CO_2 \leftrightharpoons 2CO + 2H_2 \qquad (3)$$

$$CO + H_2O \leftrightharpoons CO_2 + H_2 \qquad (4)$$

The relative amounts of the CO and $H_2$ in the reaction product mixture resulting from the catalytic net partial oxidation of the methane, or natural gas, and oxygen feed mixture are about 2:1$H_2$:CO, similar to the stoichiometric amounts produced in the partial oxidation reaction of Reaction 2.

Suitable promoted Ni—MgO catalysts are prepared as described in the following examples. Preferred catalysts comprise about 0.01-0.5 wt % (based on total weight of the monolith or non-foam catalyst) of a Pt or other noble metal promoter, 0.1-5 wt % (based on total weight of the supported catalyst) of a lanthanide or transition metal promoter, 0.1-50 wt % (based on total weight of the monolith or non-foam catalyst) of nickel, and about 0.05-25 wt % magnesium on a support of partially stabilized zirconia (PSZ) (i.e., magnesium stabilized zirconia), zirconia stabilized alumina, yttrium stabilized zirconia, calcium stabilized zirconia, alumina (preferably alpha-alumina), cordierite, $ZrO_2$ or $TiO_2$. Some of the more preferred catalyst compositions comprise about 0.05-0.2 wt % Pt over a layer of 0.5-2.0 wt % Cr over a layer of 8-20 wt % Ni over a layer of 3-8 wt % Mg deposited on a PSZ monolith or alumina support, especially 0.05 wt % Pt over 0.8 wt % Cr over 12.9 wt % Ni over 3.9 wt % Mg on PSZ foam monolith.

Alternatively, the catalyst compositions can be defined in terms of the atomic ratios as follows: Preferred catalysts comprise about 0.0001-0.01 atomic ratio of Pt/Mg or Rh/Mg (promoter-2), 0.01-1.0 lanthanide/Mg or transition metal/Mg (promoter-1), 0.1-5 atomic ratio of Ni/Mg, and about 0.05-25 wt % magnesium on a support of partially stabilized zirconia (PSZ) (i.e., magnesium stabilized zirconia), zirconia stabilized alumina, yttrium stabilized zirconia, calcium stabilized zirconia, alumina (preferably alpha-alumina), cordierite, $ZrO_2$ or $TiO_2$. Some of the more preferred catalyst compositions are made by serially depositing 0.0001-0.005 atomic ratio of Pt/Mg over 0.05-0.5 atomic ratio of Cr/Mg over 1.0-3.0 atomic ratio of Ni/Mg over 3-8 wt % Mg (based on total catalyst weight) deposited on a refractory support, especially 0.0016 atomic ratio of Pt/Mg over 0.10 atomic ratio of Cr/Mg over 1.36 atomic ratio of Ni/Mg over 3.9 wt % Mg on a refractory support such as a PSZ monolith or alumina pills. Preferably employing a very fast contact (i.e., millisecond range)/fast quench (i.e., less than one second) reactor assembly, a feed stream comprising a hydrocarbon feedstock and an oxygen-containing gas are mixed together and contacted with a Ni—MgO-containing catalyst described below.

Without further elaboration, it is believed that one skilled in the art can, using the description herein, utilize the present invention to its fullest extent. The following embodiments are to be construed as illustrative, and not as limiting the disclosure in any way.

EXAMPLES

Example 1

Unpromoted Ni—MgO Solid Solution Catalyst Supported on a PSZ Foam

A representative unpromoted Ni—MgO solid solution catalyst supported on a PSZ foam monolith was prepared by impregnating the support with aqueous solutions of Mg and Ni precursors according to the following procedure, given here for laboratory-scale batches:

a. 0.4266 gram of Mg-nitrate (Aldrich) was dissolved in 2.4 grams of distilled and de-ionized (DDI) water at about 70° C. on the hotplate. The solution was added to PSZ foam (½" diameter×⅜" long, 80 ppi, 1.3146 grams), commercially available from Vesuvius Hi-Tech Ceramics Inc., Alfred Station, N.Y.

b. The material was dried at about 70° C. for 2 hours and subjected to a programmed heat treatment in air according to the following schedule: at a heating rate of 5° C./min ramp up to 125° C.; hold at 125° C. for 1 hour; at a heating rate of 5° C./min ramp up to 400° C.; hold at 400° C. for 2 hours; at a heating rate of 5° C./min ramp up to 900° C.; hold at 900° C. for 2 hours; at a cooling rate of 10° C./min ramp down to room temperature.

c. The above procedure was repeated until about 5 wt % MgO based on the weight of PSZ foam was obtained.

d. 0.7168 gram of Ni-nitrate (Aldrich) was dissolved in 1.1 grams of DDI water at about 70° C. and added to the MgO-coated PSZ foam at about 70° C.

e. The material was dried at about 70° C. for 2 hours, and subjected to a programmed heat treatment in air according to the same schedule as in step (b).

f. The above procedure was repeated until about 11 wt % Ni oxide based on the weight of PSZ foam was obtained.

g. The catalyst was reduced with $H_2$ using 1:1 by volume flow of $N_2$:$H_2$ mixture at 0.3 standard liter per minute (SLPM) measured at 0° C. and 1 atm pressure, using the following schedule: at a heating rate of 5° C./min ramp up to 125° C.; hold at 125° C. for 0.5 hour; at a heating rate of 5° C./min ramp up to 700° C.; hold at 700° C. for 3 hours; at a cooling rate of 5° C./min ramp down to room temperature.

Example 2

Unpromoted Ni—MgO Solid Solution Catalyst Supported on a PSZ Foam

A representative unpromoted Ni—MgO solid solution catalyst supported on a PSZ foam monolith (½" diameter× ⅜" long, 80 ppi, 1.0291 grams), was prepared by impregnating the support with aqueous solutions of Mg and Ni acetates, instead of the nitrate precursors used in Example 1, using the same procedure as in Example 1. 0.3050 gram of Mg-acetate (Aldrich) and 0.4874 gram of Ni-acetate (Aldrich) were used.

Example 3

Mn-Promoted Ni—MgO Solid Solution Catalyst Supported on A PSZ Foam

A Mn-promoted Ni—MgO solid solution catalyst supported on a PSZ (MgO) foam monolith (½" diameter×⅜" long, 80 ppi, 0.9251 gram), was prepared by impregnating the support with aqueous solutions of Mg and Ni nitrate precursors, using the same procedure as in Example 1. 0.32 gram of Mg-nitrate (Aldrich) and 0.50 gram of Ni-nitrate (Aldrich) were used. 0.1290 gram of Mn-nitrate (Aldrich) was dissolved in 0.7 gram of DDI water at about 70° C. and added to the (NiO+MgO)-coated PSZ foam at about 70° C. The material was dried at about 70° C. for 2 hours and subjected to a programmed heat treatment in air according to the heat treatment schedule mentioned in step (b), Example 1. The above procedure resulted in about 3 wt % Mn oxide loading based on the weight of PSZ foam. The catalyst was reduced with $H_2$ using the reduction schedule mentioned in step (g), Example 1.

Example 4

La-promoted Ni—MgO Solid Solution Catalyst Supported on a PSZ Foam

A La-promoted Ni—MgO solid solution catalyst supported on a PSZ foam monolith (½" diameter×⅜" long, 80 ppi, 0.8950 gram), was prepared by impregnating the support with aqueous solutions of Mg and Ni nitrate precursors, using the same procedure as in Example 1. 0.32 gram of Mg-nitrate (Aldrich) and 0.50 gram of Ni-nitrate (Aldrich) were used. 0.0927 gram of La-nitrate (Aldrich) was dissolved in 0.6 gram of DDI water at about 70° C. and added to the (NiO+MgO)-coated PSZ foam at about 70° C. The material was dried at about 70° C. for 2 hours and subjected to a programmed heat treatment in air according to the heat treatment schedule mentioned in step (b), Example 1. The above procedure resulted in about 3 wt % La oxide loading based on the weight of PSZ foam. The catalyst was reduced with $H_2$ using the reduction schedule mentioned in step (g), Example 1.

Test Procedure-1

Representative promoted Ni—MgO catalysts were evaluated for their ability to catalyze the partial oxidation reaction in a conventional flow apparatus using a quartz reactor with a length of 12 inches, an outside diameter of 19 mm and an inside diameter of 13 mm. Ceramic foam pieces of 99% $Al_2O_3$ (12 mm outside diameter×5 mm thick, with 45 pores per linear inch) were placed before and after the catalyst as radiation shields. The inlet radiation shield also aided in uniform distribution of the feed gases. An Inconel-sheathed, single point K-type (Chromel/Alumel) thermocouple was placed axially inside the reactor, touching the top (inlet) face of the radiation shield. A high temperature S-Type (Pt/Pt 10% Rh) bare-wire thermocouple was positioned axially touching the bottom face of the catalyst, and was used to indicate the reaction temperature. The catalyst and the two radiation shields were tightly sealed against the inside walls of the quartz reactor by wrapping the shields radially with a high purity (99.5%) alumina paper. A 600-watt band heater set at 90% electrical output was placed around the quartz tube, providing heat to light off the reaction and preheat the feed gases. The bottom of the band heater corresponded to the top of the upper radiation shield.

In addition to the thermocouples placed above and below the catalyst, the reactor also contained two axially positioned, triple-point thermocouples, one before and another after the catalyst. These triple-point thermocouples were used to determine the temperature profiles of the reactants and products that were subjected to preheating and quenching, respectively.

The runs were conducted at a $CH_4:O_2$ molar ratio of 2:1 with a combined flow rate of about 3.5-3.8 SLPM (standard liters per minute), corresponding to a gas hourly space velocity of 178,000-206,000 $hr^{-1}$ and at a pressure of 5 psig (136 kPa). The reactor effluent was analyzed using a gas chromatograph equipped with a thermal conductivity detector. The carbon, hydrogen, and oxygen mass balances all closed to between 98% and 102%.

Table 1 lists the catalyst composition discussed in the Examples 1-5, which were tested at ambient pressure conditions as described in the Test Procedure-1 section. The data reported in Table 2 were obtained after at least 6 hours on stream at the specified conditions.

70° C. on the hotplate. The solution was added to PSZ foam (½" diameter×⅝" long, 80 ppi, 1.2180 grams), commercially available from Vesuvius Hi-Tech Ceramics Inc., Alfred Station, N.Y.

b. The material was dried at about 70° C. for 2 hours and subjected to a programmed heat treatment in air according to the following schedule: at a heating rate of 5° C./min ramp up to 125° C.; hold at 125° C. for 1 hour; at a heating rate of 5° C./min ramp up to 400° C.; hold at 400° C. for 1 hour; at a heating rate of 5° C./min ramp up to 800° C.; hold at 800° C. for 1 hour; at a heating rate of 5° C./min ramp up to 1000° C.; hold at 1000° C. for 3 hours; at a cooling rate of 10° C./min ramp down to room temperature.

c. The above procedure was repeated until about 5 wt % MgO based on the weight of PSZ foam was obtained.

d. 0.6260 gram of Ni-acetate (Aldrich) was dissolved in 1.9 grams of DDI water at about 70° C. and added to the MgO-coated PSZ foam at about 70° C.

e. The material was dried at about 70° C. for 2 hours, and subjected to a programmed heat treatment in air according to the same schedule as in step (b).

f. The above procedure was repeated until about 14 wt % Ni oxide based on the weight of PSZ foam was obtained.

TABLE 1

Catalyst Composition

| Ex. | Support | Wt % (of total catalyst weight) Mg/Ni/Promoter-1/Promoter-2 | Ni/Mg atomic ratio | Promoter-1/Mg atomic ratio | Promoter-2/Mg atomic ratio |
|---|---|---|---|---|---|
| 1 | PSZ (80 ppi, ⅜" L × ½" D) | 2.8/7.6/—/— | 1.13 | — | — |
| 2 | PSZ (88 ppi, ⅜" L × ½" D) | 3.8/9.2/—/— | 1.00 | — | — |
| 3 | PSZ (80 ppi, ⅜" L × ½" D) | 2.7/9.0/2.5 (Mn)/— | 1.38 | 0.41 | — |
| 4 | PSZ (80 ppi, ⅜" L × ½" D) | 2.8/9.2/2.7 (La)/— | 1.38 | 0.17 | — |

PSZ denotes "partially stabilized zirconia, with 5% Mg"; porosity is indicated in pores per inch (ppi); promoter metals are indicated in parentheses next to the composition.

TABLE 2

Ambient Pressure Performance Data for Ni-MgO Catalysts

| | Flow rate | | Temp. | $CH_4$ | Selectivity | |
|---|---|---|---|---|---|---|
| Ex. | (SLPM) | GHSV | (° C.) | Conv. | CO | $H_2$ |
| 1 | 3.702 | 184,000 | 700 | 82 | 94 | 91 |
| 2 | 3.885 | 193,100 | 734 | 78 | 94 | 89 |
| 3 | 3.624 | 180,200 | 712 | 84 | 96 | 91 |
| 4 | 3.585 | 178,000 | 715 | 79 | 93 | 83 |

Example 5

Pt Promoted Ni—MgO Solid Solution Catalyst on a PSZ Foam

A representative Pt promoted Ni—MgO solid solution catalyst supported on a PSZ foam monolith was prepared by impregnating the support with aqueous solutions of Mg and Ni precursors according to the following procedure, given here for laboratory-scale batches:

a. 0.3696 gram of Mg-acetate (Aldrich) was dissolved in 1.1 grams of Distilled & De-Ionized (DDI) water at about g. An aqueous solution of tetramine-Pt(II)-nitrate (Aldrich) was used to impregnate the catalyst to get a Pt loading of about 0.05% by weight of the monolith. The catalyst was dried on hotplate at 70° C. for 2 hours, and subjected to a programmed heat treatment using the following schedule: at a heating rate of 5° C./min ramp up to 125° C.; hold at 125° C. for 1 hour; at a heating rate of 5° C./min ramp up to 250° C.; hold at 250° C. for 3 hours; at a cooling rate of 110° C./min ramp down to room temperature.

h. The catalyst was reduced with $H_2$ using 1:1 by volume flow of $N_2:H_2$ mixture at 0.3 standard liter per minute (SLPM) measured at 0° C. and 1 atm pressure, using the reduction schedule mentioned in step (g), Example 1.

Example 6

Pt and Mn-promoted Ni—MgO Solid Solution Catalyst on PSZ Foam

A Mn-promoted Ni—MgO solid solution catalyst supported on a PSZ foam (½" diameter×⅝" long, 80 ppi, 1.2454 grams) was prepared, using a similar procedure to that described in Example 5, except as follows: 0.4067 gram of Mg-acetate and 1.0653 grams of Ni-acetate were used. 0.1195 gram of Mn-nitrate (Aldrich) was dissolved in 0.8 gram of DDI water at about 70° C. and added to the (NiO+MgO)-coated PSZ foam at about 70° C. The material was dried at about 70° C. for 2 hours and subjected to a programmed heat treatment in air according to the following schedule: at a heating rate of 5° C./min ramp up to 125° C.; hold at 125° C. for 1 hour; at a heating rate of 5° C./min ramp up to 250° C.; hold at 250° C. for 1 hour; at a heating rate of 5° C./min ramp up to 500° C.; hold at 500° C. for 3 hours; at a cooling rate of 10° C./min ramp down to room temperature. The above procedure was repeated until 2 wt % Mn oxide based on the weight of PSZ foam was obtained. An aqueous solution of tetramine-Pt(II)-nitrate (Aldrich) was used to impregnate the catalyst to get a Pt loading of about 0.05% by weight of the monolith. The catalyst was dried on hotplate at 70° C. for 2 hours, and subjected to a programmed heat treatment using the following schedule: at a heating rate of 5° C./min ramp up to 125° C.; hold at 125° C. for 1 hour; at a heating rate of 5° C./min ramp up to 250° C.; hold at 250° C. for 3 hours; at a cooling rate of 10° C./min ramp down to room temperature. The catalyst was reduced with $H_2$ using the reduction schedule mentioned in step (g), Example 1.

Example 7

Pt and La-promoted Ni—MgO Solid Solution Catalyst on PSZ Foam

A La-promoted Ni—MgO solid solution catalyst supported on a PSZ foam (½" diameter×⅝" long, 80 ppi, 1.4198 grams) was prepared, using a similar procedure to that described in Example 6, except as follows: 0.4622 gram of Mg-acetate and 1.2154 grams of Ni-acetate were used. 0.0932 gram of La-nitrate (Aldrich) was dissolved in 0.8 gram of DDI water at about 70° C. and added to the (NiO+MgO)-coated PSZ foam at about 70° C. The material was dried at about 70° C. for 2 hours and subjected to a programmed heat treatment in air according to the schedule mentioned in Example 6. The above procedure was repeated until 2 wt % La oxide based on the weight of PSZ foam was obtained. An aqueous solution of tetramine-Pt(II)-nitrate (Aldrich) was used to impregnate the catalyst to get a Pt loading of about 0.05% by weight of the PSZ monolith. The catalyst was dried on hotplate at 70° C. for 2 hours, and subjected to a programmed heat treatment in air according to the schedule mentioned in Example 6. The catalyst was reduced with $H_2$ using the reduction schedule mentioned in step (g), Example 1.

Example 8

Pt and Cr-promoted Ni—MgO Solid Solution Catalyst on PSZ Foam

A Cr-promoted Ni—MgO solid solution catalyst supported on a PSZ foam (½" diameter×⅝" long, 80 ppi, 1.1581 grams) was prepared, using a similar procedure to that described in Example 6, except as follows: 0.3797 gram of Mg-acetate and 1.0820 grams of Ni-acetate were used. 0.1825 gram of Cr-nitrate (Aldrich) was dissolved in 0.8 gram of DDI water at about 70° C. and added to the (NiO+MgO)-coated PSZ foam at about 70° C. The material was dried at about 70° C. for 2 hours and subjected to a programmed heat treatment in air according to the heat treatment schedule mentioned in Example 6. The above procedure was repeated until 1 wt % Cr oxide based on the weight of PSZ foam was obtained. An aqueous solution of tetramine-Pt(II)-nitrate (Aldrich) was used to impregnate the catalyst to get a Pt loading of about 0.05% by weight of the PSZ monolith. The catalyst was dried on hotplate at 70° C. for 2 hours, and subjected to a programmed heat treatment in air according to the schedule mentioned in Example 6. The catalyst was reduced with $H_2$ using the reduction schedule mentioned in step (g), Example 1.

Example 9

Pt and Ce-promoted Ni—MgO Solid Solution Catalyst on PSZ Foam

A Ce-promoted Ni—MgO solid solution catalyst supported on a PSZ foam (½" diameter×⅝" long, 80 ppi, 1.4734 grams) was prepared, using a similar procedure to that described in Example 6, except as follows: 0.4804 gram of Mg-acetate and 1.2461 grams of Ni-acetate were used. 0.0933 gram of Ce-nitrate (Aldrich) was dissolved in 0.8 gram of DDI water at about 70° C. and added to the (NiO+MgO)-coated PSZ foam at about 70° C. The material was dried at about 70° C. for 2 hours and subjected to a programmed heat treatment in air according to the heat treatment schedule mentioned in Example 6. The above procedure was repeated until 2 wt % Ce oxide based on the weight of PSZ foam was obtained. An aqueous solution of tetramine-Pt(II)-nitrate (Aldrich) was used to impregnate the catalyst to get a Pt loading of about 0.05% by weight of the PSZ monolith. The catalyst was dried on hotplate at 70° C. for 2 hours, and subjected to a programmed heat treatment in air according to the schedule mentioned in Example 6. The catalyst was reduced with $H_2$ using the reduction schedule mentioned in step (g), Example 1.

Example 10

Unpromoted Ni—MgO Solid Solution Catalyst Supported on α-$Al_2O_3$ Pills

A representative unpromoted Ni—MgO solid solution catalyst supported on α-$Al_2O_3$ pills (Norton, 6 mesh, fused, 99.99% purity) was prepared according to the following procedure, given here for laboratory-scale batches:
  (a) 4.4029 grams of Mg-nitrate (Aldrich) and 8.6136 grams of Ni-nitrate were dissolved in 15 grams of DDI water at about 70° C. on the hotplate. The solution was added to alumina pills (12.5041 grams).
  (b) The material was dried at about 70° C. for 1 hour on the hotplate, dried overnight at 110° C. in a convection oven, and subjected to a programmed heat treatment in air according to the following schedule: at a heating rate of 5° C./min ramp up to 200° C.; hold at 200° C. for 1 hour; at a heating rate of 5° C./min ramp up to 500° C.; hold at 500° C. for 1 hour; at a heating rate of 5° C./min ramp up to 900° C.; hold at 900° C. for 2 hours; at a cooling rate of 10° C./min ramp down to room temperature.
  (c) The above procedure was repeated to get a loading of about 5 wt % MgO and 13 wt % NiO based on the weight of alumina pills. The catalyst was reduced with $H_2$ using the reduction schedule mentioned in step(g), Example 1.

Test Procedure-2

The partial oxidation reactions were carried out in a conventional flow apparatus using a 19 mm O.D.×13 mm I.D. quartz insert embedded inside a refractory-lined steel vessel. The quartz insert contained a catalyst system containing at least one porous monolith catalyst (about 12 mm O.D.×15 mm high) held between two foam disks. In the case of the pill-supported catalyst (Example 10), the catalyst was packed between the two foam disks. The upper disk typically consisted of 65-ppi PSZ and the bottom disk typically consisted of 30-ppi zirconia-toughened alumina. Preheating the methane or natural gas that flowed through the catalyst system provided the heat needed to start the reaction. Oxygen was mixed with the methane or natural gas immediately before the mixture entered the catalyst system. Once the reaction started, it proceeded autothermally. Two Type K thermocouples with ceramic sheaths were used to measure catalyst inlet and outlet temperatures. The molar ratio of $CH_4$ to $O_2$ was generally about 2:1, however the relative amounts of the gases, the catalyst inlet temperature and the reactant gas pressure could be varied by the operator according to the parameters being evaluated (see Table 4). The product gas mixture was analyzed for $CH_4$, $O_2$, CO, $H_2$, $CO_2$ and $N_2$ using a gas chromatograph equipped with a thermal conductivity detector. A gas chromatograph equipped with flame ionization detector analyzed the gas mixture for $CH_4$, $C_2H_6$, $C_2H_4$ and $C_2H_2$. The $CH_4$ conversion levels and the CO and $H_2$ product selectivities obtained for each catalyst evaluated in this test system are considered predictive of the conversion and selectivities that will be obtained when the same catalyst is employed in a commercial scale short contact time reactor under similar conditions of reactant concentrations, temperature, reactant gas pressure and space velocity.

Table 3 lists the catalyst compositions discussed in the Examples 5-10, which were tested at higher pressures as described in Test Procedure-2. The test results are given in Table 4.

Without wishing to be limited to a particular theory, it is believed that in the catalyst preparation methods of Examples 3, 4, and 6-9, by adding MgO first, and then Ni, the Ni interacts mainly with MgO and thus forms a stable solid solution. By contrast, when both Mg and Ni are added together, the Ni is shared between MgO and the support oxide, minimizing the efficiency of the solid solution. MgO, in addition to being a component of the solid solution, is believed to act as a barrier between Ni and the support oxide. More importantly, calcination temperature and Ni/Mg atomic ratio influence the diffusion of Ni into the MgO lattice. These parameters are preferably manipulated to provide the present catalysts having enhanced stability and activity for catalyzing the CPOX reaction.

Analyses show that some promoters such as Mn, Rh and Cr may become a part of the solid solution, whereas other promoters may not. By employing higher calcination and reduction temperatures, and optimized heating and cooling programs, as illustrated in the foregoing examples, the stability of the solid solution is improved, compared to conventional solid solution catalysts, through better diffusion of Ni atoms in the MgO lattice, for example. This was confirmed by the X-ray Absorption Fine-Structure Spectroscopy (EXAFS) experiments. Intensity ratio of [(Ni—Ni)/{(Ni—Mg)+(Ni—Ni)}] peaks is a good indication of the formation and stability of the solid solution: Theoretical value for a dilute solid solution standard based on nearest neighbor coordination is 0.36. The catalyst from Example 4 was analyzed after testing for 6 hours by EXAFS technique and gave an intensity ratio of 0.36, confirming the existence of solid solution. This proves the improved stability of the Ni—MgO solid solution catalysts. Transmission Electron

TABLE 3

Catalyst Composition

| Ex. | Support | Wt % (of total catalyst weight) Mg/Ni/Promoter-1/Promoter-2 | Ni/Mg atomic ratio | Promoter-1/Mg atomic ratio | Promoter-2/Mg atomic ratio |
|---|---|---|---|---|---|
| 5 | PSZ (80 ppi, ⅝" L × ½" D) | 3.9/12.7/—/0.05 Pt | 1.36 | — | 0.0016 |
| 6 | PSZ (80 ppi, ⅝" L × ½" D) | 4.1/10.2/1.5 (Mn)/0.05 (Pt) | 1.11 | 0.16 | 0.0015 |
| 7 | PSZ (80 ppi, ⅝" L × ½" D) | 4.0/10.6/1.4 (La)/0.05 (Pt) | 1.09 | 0.06 | 0.0016 |
| 8 | PSZ (80 ppi, ⅝" L × ½" D) | 3.9/12.9/0.8 (Cr)/0.05 (Pt) | 1.36 | 0.10 | 0.0016 |
| 9 | PSZ (80 ppi, ⅝" L × ½" D) | 4.0/11.3/1.46 (Ce)/0.05 (Pt) | 1.17 | 0.06 | 0.0016 |
| 10 | α-$Al_2O_3$ (6 mesh, 2.8 grams) | 2.7/11.4/—/— | 1.72 | — | — |

TABLE 4

High Pressure Performance Data for Ni-MgO Catalysts

| Ex. | NG:$O_2$ molar ratio | Pressure (psig) | GHSV | Temp. (° C.) | $CH_4$ Conv. | Selectivity CO | Selectivity $H_2$ |
|---|---|---|---|---|---|---|---|
| 5 | 1.7:1 | 45 | 935,000 | 1123 | 73 | 79 | 68 |
| 6 | 1.8:1 | 45 | 759,000 | 1212 | 66 | 71 | 85 |
| 7 | 1.8:1 | 45 | 881,000 | 1172 | 75 | 85 | 73 |
| 8 | 1.6:1 | 45 | 1,101,000 | 1156 | 79 | 87 | 78 |
| 9 | 1.8:1 | 45 | 758,000 | 1174 | 75 | 86 | 78 |
| 10 | 1.8:1 | 45 | 1,246,000 | 1080 | 77 | 75 | 67 |

NG = Natural Gas;
45 psi = about 3 atm (304 kPa)

Microscopy (TEM) analysis of the catalysts both before and after testing also confirm the existence of solid solutions of NiO and MgO, and of promoter oxide and MgO (in the case of Mn and Cr promoters), indicating that the stability of these catalyst systems is a result of the stronger interaction between the catalytic components.

When a promoter, or a portion of a promoter, becomes a part of the solid solution, it tends to provide a more stable catalyst because of the sharing of common oxygen. Due to the serial application of the precursor compounds, and the programmed heat treatments outlined in the Examples, above, some promoters may exist in the catalyst partially diffused into the Ni—MgO solid solution and partially as a layer of pure promoter metal and/or metal oxide deposited on the Ni—MgO containing solid solution. By contrast, if applied as part of a mixed metal salts solution, the same promoter could interact more with the MgO than with the Ni, potentially reducing the overall efficiency of the catalyst.

In the present studies, two types of promoters have been identified. The first type of promoter (e.g., Mn) is applied to minimize or eliminate carbon deposition and to stabilize the solid solution. The first promoter can also aid in lowering the light off temperature in some cases. The second type of promoter (e.g., Pt) is added in very small amounts to specifically lower the light off temperature. In addition to these primary promoter effects, it was observed in these investigations that the two types of promoters in some cases provided some secondary, overlapping functions. This was due to the fact that the promoter properties that facilitate hydrocarbon activation also aid in burning off the carbon, thus deterring coking on the catalyst. In addition, there may be a small increase in hydrocarbon conversion due to promoter addition.

Table 5 shows the carbon analysis results for the Ni—MgO spent catalysts of Examples 5-10. For each catalyst, the weight of each sample after testing is given.

TABLE 5

Carbon Analysis of Spent Catalysts

| Example No. | Weight after testing (grams) | Weight after carbon removal (grams) | Carbon wt % (based on weight after testing) |
|---|---|---|---|
| 5-No promoter (foam support)* | 0.3 | 0.2819 | 6.03 |
| 6-Mn | 1.4449 | 1.4196 | 1.75 |
| 7-La | 1.5716 | 1.5603 | 0.72 |
| 8-Cr | 1.3899 | 1.3718 | 1.30 |
| 9-Ce | 1.8511 | 1.8348 | 0.88 |
| 10-No promoter (pill support) | 0.8195 | 0.819 | 0.06 |

*The "no-promoter foam-supported" sample (Example No. 5) broke down upon removal from the reactor, thus only a piece of the catalyst was used for carbon removal.

The carbon removal treatment was done as follows: The samples were dried in a convection oven at 100° C. overnight to remove the volatiles and any adsorbed gases. This was followed by calcination in air at 550° C. for 12 hours. Finally, to convert the oxidized metals to the reduced state, the samples were reduced in 50:50 $N_2:H_2$ mixture at 0.3 SLPM at 125° C./0.5 h and 500° C./3 h with 5° C./min ramp. The weight after reduction is shown above as "weight after carbon removal." Carbon wt % was calculated as (weight after testing—weight after carbon removal)/weight after carbon removal×100. From the data shown in Table 5, it can be seen that the presence of promoters helped reduce the extent of carbon formation, even after testing at 45 psig pressure and flow rates on the order of 750,000-1,200,000 $h^{-1}$ GHSV. The foam-supported catalysts are prone to carbon deposition in the interstitial pores, therefore the reported carbon may not be entirely deposited on the metal. This is also indicated by the carbon wt % value for the Example 10 catalyst, which was supported on alumina pill. As compared to the unpromoted form, the promoter effect on carbon resistance ranges as follows (in order of most-efficient to less-efficient): La, Ce, Cr, Mn.

Comparison of the performance results for the unpromoted catalysts of Example 5 and Example 10, in Table 4, shows that Example 10 gave superior performance at higher flow rate despite the absence of promoters. Without wishing to be limited to a single theory, this observed difference between catalysts may be due to the increased Ni content as shown by the higher Ni/Mg atomic ratio, and the use of non-foam alumina supports in the form of pills, which result in better heat transfer through the catalyst bed. Combining the advantages of the various promoters with the advantageous non-foam (i.e., divided) support characteristics, it is clear that highly carbon-resistant Ni—MgO solid solution catalysts can be synthesized using the described procedures, and selective syngas performance can be attained.

A suitable catalyst support structure is a foam monolith made of partially (MgO) stabilized zirconia (PSZ), or alpha-alumina. Another refractory ceramic oxide foam monolith that is chemically and physically stable under the required partial oxidation reaction conditions could be substituted for the PSZ monolith, if desired. For example, cordierite, alumina, titania, mullite, and mixtures of those materials. Also, thermally stabilizing substances other than MgO could also be used with success (such as calcium or yttrium oxide) to modify the above support materials. Suitable foams for use in the preparation of the catalyst preferably have from 30 to 150 pores per inch (12 to 60 pores per centimeter). Alternative support structures for the catalyst include refractory oxide honeycomb monolith structures, such as a honeycomb substrate made of cordierite or mullite (Johnson Matthey, Taylor, Mich. or Corning, N.Y.), or other configuration having longitudinal channels or passageways permitting high space velocities with a minimal pressure drop. Such configurations are known in the art and described, for example, in Structured Catalysts and Reactors, A. Cybulski and J. A. Moulijn (Eds.), Marcel Dekker, Inc., 1998, p. 599-615 (Ch. 21, X. Xu and J. A. Moulijn, "Transformation of a Structured Carrier into Structured Catalyst").

Promoted Ni—MgO catalysts carried on divided supports containing a number of "discrete" structures or units, such as particles, pills, granules, beads, pellets, cylinders, trilobes, extrudates, spheres or other rounded shapes, or other geometry that provides satisfactory engineering performance, before application of the catalytic materials, are expected to provide better activity than correspondingly loaded monolith supported catalysts. Therefore, the preferred catalyst geometry of the promoted Ni—MgO catalysts is granular or divided form. Such non-foam supports do not necessarily possess any pre-formed porous shapes as in the case of foam monoliths or honeycomb monoliths, but are placed in the reactor in such a manner as to allow operation at high space velocities, high pressures and high temperatures. The granules or other divided support structures range in size from 50 microns to 6 mm in diameter (i.e., about 120 mesh, or even smaller, to about ¼ inch). Preferably the particles are no more than 3 mm in their longest characteristic dimension, or range from about 80 mesh (0.18 millimeters) to about ⅛ inch, and more preferably about 35-50 mesh. The term "mesh" refers to a standard sieve opening in a screen through which the material will pass, as described in the Tyler Standard Screen Scale (C. J. Geankoplis, "Transport Processes and Unit Operations", Allyn and Bacon, Inc., Boston, Mass., p. 837), hereby incorporated herein by reference. The support may be serially impregnated with the other catalyst components, as described above for the PSZ monolith, or similarly applied using another suitable technique, such as washcoating, adsorption, ion exchange, precipitation, co-precipitation, deposition precipitation, sol-gel method, slurry dip-coating, microwave heating, and other methods known in the art for preparing a supported catalyst, to obtain a similar catalyst structure.

Alternative methods of constructing the catalysts can be employed using techniques that are well known in the art, such as powder synthesis and serial washcoating of the powders onto the support, in steps that are analogous to those exemplified above wherein the MgO is coated on the support first, followed by Ni metal and/or metal oxide, and then one or more promoter metals and/or metal oxides, applied separately or in combination, to provide catalysts of similar composition with similar activity. As described in the examples, the catalyst is in any case subjected to programmed heating and cooling treatments during construction to thermally condition and stabilize the catalyst. Without wishing to be limited to a particular theory, it is believed that the finished catalyst, which results from the serial construction methods exemplified herein, can include one or more of the following states: (a) the nickel component entirely or partially in solid solution with MgO, with one or more promoters deposited over a $Ni^0$ layer; (b) a portion of the nickel component alloyed with one or more promoters and disposed as a layer over a NiO—MgO solid solution; (c) a portion of one or more promoters in solid solution with NiO—MgO; (d) one or more separate or combined promoter layers on a NiO—MgO solid solution, all carried on a refractory support that is, preferably, catalytically inert. Also, one or more of the promoters can exist as a mixture of both the metal and metal oxide states in the catalyst.

Although a preferred promoter is chromium and/or chromium oxide, the activity and selectivity demonstrated by Cr and other promoters including Mn, Rh, Pt, La and Ce, and their oxides, in the present studies, strongly suggests that Co, Mo, W, Sn, Re, Pd, Ru, Ir, Sm, Yb, Eu, Pr, Lu, Bi, Sb, In and P, and oxides thereof, will also provide superior syngas catalysts when prepared as exemplified herein with Cr. Further support for this conclusion can be seen in co-assigned U.S. patent application Ser. No. 09/626,665, which describes mixed metal/metal oxide CPOX catalysts containing nickel supported on magnesium oxide, and about 0.1-10 wt % of at least one promoter selected from Mn, Mo, W, Sn, Re, Bi, In and P (as metals or metal oxides), carried on a refractory support. It has also been shown in co-assigned U.S. patent application Ser. No. 09/881,298 that catalysts containing a NiO—MgO sputter coated fecralloy substrate and an active metal catalyst outer layer, such as Rh, are active for catalyzing the net CPOX reaction to produce CO and $H_2$.

While the above-described ramped heating and cooling protocols are preferred, they can be varied to a certain extent and still provide satisfactory results. The heating rate ranges from 0.1-50° C./min, preferably 1-20° C./min, preferably 3-8° C./min, and more preferably 1-5° C./min. The desired cooling rate ranges from, preferably, 1-25° C./min, more preferably 3-15° C./min, and most preferably 5-10° C./min. The holding time at each temperature ranges from 30-1,440 min, with 60-240 min being most preferred. In the foregoing Examples, the samples were reduced prior to being placed in the reactor. In some situations it might be preferred to instead, or additionally, treat the catalyst to reducing conditions in situ in the catalyst zone of a short contact time syngas production reactor prior to introduction of the reactant gas mixture and initiation of the catalytic partial oxidation reaction.

Syngas Production Process

Preferably employing a very fast contact (i.e., millisecond range)/fast quench (i.e., less than one second) reactor assembly, a feed stream comprising a light hydrocarbon feedstock and an oxygen-containing gas are mixed together and contacted with a promoted Ni/MgO catalyst described herein. Several schemes for carrying out catalytic partial oxidation (CPOX) of hydrocarbons in a short contact time reactor have been described in the literature. For example, U.S. Pat. Nos. 6,402,989, 6,409,940 and 6,488,907, the disclosures of which are hereby incorporated herein by reference. One suitable reaction regime is a fixed bed reaction regime, in which the catalyst is retained within a reaction zone in a fixed arrangement. The feed stream is preferably contacted with the catalyst in a reaction zone maintained at autothermal net partial oxidation-promoting conditions effective to produce an effluent stream comprising primarily carbon monoxide and hydrogen. The hydrocarbon feedstock may be any gaseous hydrocarbon having a low boiling point, such as methane, natural gas, associated gas, or other sources of light hydrocarbons having up to 5 carbon atoms. The hydrocarbon feedstock may be a gas arising from naturally occurring reserves of methane, which contain carbon dioxide. Preferably, the feed comprises at least about 50% by volume methane, more preferably at least 75% by volume, and most preferably at least 85% by volume methane. This syngas production process is suitable for converting feedstocks of naturally occurring reserves of methane. Natural gas is mostly methane, but it can also contain up to about 25 mole % ethane, propane, butane and even higher hydrocarbons, as well as other incidental or non-reactive species, in lesser amounts than the primary hydrocarbon and oxygen components. Some such species are $H_2$, CO, $N_2$, NOx, $CO_2$, $N_2O$, Ar, $SO_2$ and $H_2S$, which can exist normally in natural gas deposits, and can be present in the methane-containing feed without detrimentally affecting the process. Additionally, in some instances, it may be desirable to include nitrogen gas in the reactant gas mixture to act as a diluent. Nitrogen can be present by addition to the reactant gas mixture or can be present because it was not separated from the air that supplies the oxygen gas.

The hydrocarbon feedstock is in the gaseous phase when contacting the catalyst. The hydrocarbon feedstock is contacted with the catalyst as a mixture with an $O_2$ containing gas, preferably pure oxygen. The hydrocarbon feedstock may be contacted with the catalyst as a mixture containing steam and/or $CO_2$ along with a light hydrocarbon gas, as sometimes occurs in natural gas deposits.

The hydrocarbon feed and the $O_2$ containing gas are mixed in such amounts to give a carbon (i.e., carbon in methane) to oxygen (i.e., molecular oxygen) ratio from about 1.5:1 to about 3.3:1, more preferably, from about 1.7:1 to about 2.1:1. The stoichiometric molar ratio of about 2:1 ($CH_4$:$O_2$) is especially desirable in obtaining the net partial oxidation reaction products ratio of 2:1 $H_2$:CO. In some situations, such as when the methane-containing feed is a naturally occurring methane reserve, carbon dioxide may also be present in the methane-containing feed without detrimentally affecting the process.

The hydrocarbon feedstock and/or the oxygen-containing gas are preferably pre-heated before contacting with the catalyst from about 30° C. to about 750° C., preferably about 300° C. In some instances it may be desirable to briefly add to the hydrocarbon feed a sufficient amount of a combustible gas, such as propane, to initiate the reaction. The reactant gas mixture is fed into a reactor where it comes into contact with a catalytically effective amount of a promoted nickel-magnesium oxide solid solution catalyst, supported on a refractory carrier, preferably a catalytically inert ceramic oxide. Representative suitable promoted Ni—MgO containing catalysts are described in the foregoing Examples. Catalytically inert porous ceramic foam monoliths are usually placed before and after the catalyst as radiation shields and floor. The inlet radiation shield also typically aids in uniform distribution of the feed gases into the catalyst zone. Other conventional support materials well known in the art, such as alumina spheres or rings can be substituted for the foam monoliths for the radiation shield and floor.

The reactant gas mixture passes over the catalyst and the catalytic materials are heated to the point at which the gases combust and start the reaction. An autothermal net catalytic partial oxidation reaction preferably ensues, and the reaction conditions are managed so as to promote continuation of the autothermal process. For the purposes of this disclosure, "autothermal" means that after catalyst ignition, no additional heat needs to be supplied to the catalyst in order for the production of synthesis gas to continue. The process is preferably operated at temperatures of from about 600° C. to about 2,000° C., preferably from about 600° C. to about 1,600° C. The process is operated at atmospheric or superatmospheric pressures, the latter being preferred.

The hydrocarbon feedstock and the oxygen-containing gas may be passed over the catalyst at any of a variety of space velocities. Space velocities for the process, stated as gas hourly space velocity (GHSV), are from about 20,000 to about 100,000,000 $hr^{-1}$, preferably from about 100,000 to about 25,000,000 $hr^{-1}$. Although for ease in comparison with prior art systems space velocities at standard conditions have been used to describe the present invention, it is well recognized in the art that residence time is the inverse of space velocity and that the disclosure of high space velocities equates to low residence times on the catalyst. Under these operating conditions a flow rate of reactant gases is maintained sufficient to ensure a residence time of no more than 200 milliseconds with respect to each portion of reactant gas in contact with the catalyst system, preferably less than 20 milliseconds, and more preferably 10 milliseconds or less.

Autothermal partial oxidation reaction conditions are also promoted by optimizing the concentrations of hydrocarbon and $O_2$ in the reactant gas mixture, preferably within the range of about 1.5:1 to about 2.3:1 ratio of carbon:oxygen. The carbon:oxygen ratio is an important variable for maintaining the autothermal reaction and the desired product selectivities. At times, however, in order to maintain the desired temperature, or control another process parameter, it may be necessary to vary the carbon:oxygen ratio. Pressure, residence time, amount of feed preheat and amount of nitrogen dilution, if used, also affect the reaction products.

The product gas mixture emerging from the reactor, preferably at superatmospheric pressure, is harvested and may be routed directly into any of a variety of applications. Preferably, the need for an intervening gas compressor can be avoided. One such application for the pressurized CO and $H_2$ product stream is for producing higher molecular weight hydrocarbon compounds using Fischer-Tropsch technology.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosures of all patents, patent applications and publications cited above are hereby incorporated herein by reference. The discussion of certain references in the Description of Related Art, above, is not an admission that they are prior art to the present invention, especially any references that may have a publication date after the priority date of this application.

What is claimed is:

1. A method of converting a light hydrocarbon and $O_2$ to a product mixture containing CO and $H_2$, the process comprising:
   forming a reactant gas mixture comprising a light hydrocarbon and $O_2$; and
   passing said reactant gas mixture over a catalyst comprising
      at least one first promoter chosen from the group consisting of Cr, Mn, La, Ce, and oxides thereof;
      at least one second promoter chosen from the group consisting of Pt, Rh, and oxides thereof;
      a solid solution comprising nickel and/or nickel oxide and magnesium oxide; and
      a refractory support,
   said catalyst having enhanced stability and enhanced resistance to coking under
   catalytic partial oxidation promoting conditions,
   such that a product mixture containing CO and $H_2$ is produced, and further wherein said catalyst comprises from about 4.0 to about 8.8 wt % Mg, from about 4.3 to about to about 11.3 wt % Ni and about 0.05 wt % Pt.

2. The method of claim 1 wherein said catalyst comprises about 8.8 wt % Mg, about 4.3 wt % Ni and about 0.05 wt % Pt.

3. The method of claim 1 wherein said catalyst comprises about 4.1 wt % Mg, about 10.2 wt % Ni, about 15 wt % Mn and about 0.05 wt % Pt.

4. The method of claim 1 wherein said catalyst comprises about 4.0 wt % Mg, about 10.6 wt % Ni, about 1.4 wt % La and about 0.05 wt % Pt.

5. The method of claim 1 wherein said catalyst comprises about 4.0 wt % Mg, about 11.3 wt % Ni, about 1.5 wt % Ce and about 0.05 wt % Pt.

6. The method of claim 1 wherein said catalyst support comprises a refractory material chosen from the group consisting of zirconia, MgO stabilized zirconia, zirconia stabilized alumina, yttrium stabilized zirconia, calcium stabilized zirconia, alumina, cordierite, mullite, titania, silica, magnesia, niobia, vanadia, nitrides and carbides, and combinations thereof.

7. The method of claim 1 wherein said support comprises a monolith.

8. The method of claim 1 wherein said support comprises a plurality of discrete structures.

9. The method of claim 8 wherein the longest characteristic dimension or each said discrete structure is in the range of 50 microns to 6 mm in length.

10. A method of converting a light hydrocarbon and $O_2$ to a product mixture containing CO and $H_2$, the process comprising:
forming a reactant gas mixture comprising a light hydrocarbon and $O_2$; and passing said reactant gas mixture over a catalyst such that a product mixture containing CO and $H_2$ is produced,
wherein said catalyst comprises
platinum;
a solid solution comprising nickel and/or nickel oxide and magnesium oxide; and
a refractory support, and
further wherein said catalyst comprises:
0.05-25 wt % Mg (wt % relative to total weight of catalyst)
1.0-5 atomic ratio of Ni (atomic ratio relative to the amount of Mg);
0.0001-0.01 atomic ratio of Pt (atomic ratio relative to the amount of Mg); and
0.05-1.0 atomic ratio of Cr (atomic ratio relative to the amount of Mg),
deposited on the refractory support.

11. The method of claim 10 wherein said catalyst comprises:
3-8 wt % Mg (wt % relative to total weight of catalyst)
1.0-3.0 atomic ratio of Ni (atomic ratio relative to the amount of Mg);
0.0001-0.005 atomic ratio of Pt (atomic ratio relative to the amount of Mg); and
0.05-0.5 atomic ratio of Cr (atomic ratio relative to the amount of Mg);
deposited on a refractory support.

12. A method of converting a light hydrocarbon and $O_2$ to a product mixture containing CO and $H_2$, the process comprising:
forming a reactant gas mixture comprising a light hydrocarbon and $O_2$; and
passing said reactant gas mixture over a catalyst such that a product mixture containing CO and $H_2$ is produced,
wherein said catalyst comprises
a solid solution comprising nickel and/or nickel oxide and magnesium oxide;
chromium;
at least one promoter consisting of Pt; and
a refractory support, and
wherein said catalyst comprises Cr deposited on the refractory support with an atomic ratio of Cr relative to the amount of Mg between 0.05 and 1.0 and
wherein said catalyst comprises 0.01-0.5 wt % Pt deposited on the refractory support (wt % relative to total weight of catalyst)..

\* \* \* \* \*